Oct. 1, 1929.  J. BOZOWICH  1,729,924

BENT SLIDING TROLLEY

Filed July 13, 1927

INVENTOR.
John Bozowich

Patented Oct. 1, 1929

1,729,924

UNITED STATES PATENT OFFICE

JOHN BOZOWICH, OF SAN FRANCISCO, CALIFORNIA

BENT SLIDING TROLLEY

Application filed July 13, 1927. Serial No. 205,451.

The primary object of my invention is the provision of a street car trolley which is durable, reliable in operation, simple in construction and that may be easily and quickly changed when desired.

Another object of the invention is to provide a trolley of the class designated which greatly minimizes the wear and tear on trolley crossings and which requires less expensive and cumbersome gear at these crossings.

Another object of the invention is that a trolley constructed in accordance with my invention may be used on small or large street cars and will not leave the trolley wire due to its width.

Other objects and advantages of the invention will be apparent with reference to the subjoined specification and the accompanying one sheet of drawings in which:—

Figure 1:
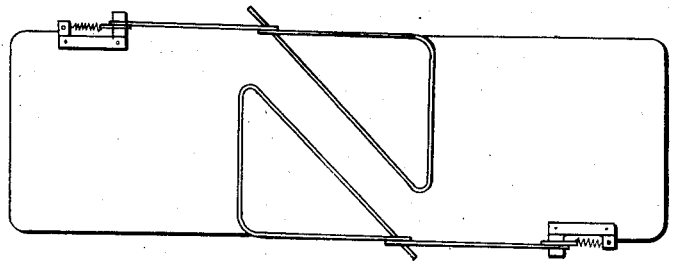
Figure 1 is a plan view of the trolley as it would appear lying flat upon the car top.

Referring more particularly to the drawings in which the preferred form of the invention has been illustrated, the numeral 1 indicates the top of the street car on which is mounted a trolley 3 adapted for engagement with the trolley wire 2, said car being adapted to run upon the usual track 8 which acts as a return conductor for the propulsion current.

The trolley 3 is formed from a single piece of heavy wire having a loop 5 at the upper end thereof, the upper part 7 thereof being adapted to be held in engagement with the trolley wire 2 by means of a spring 4. The usual trolley cord 6 is connected to the trolley 3 through a non-conductor 15.

The free end of the wire forming the loop 5 of the trolley is bent into a hook-shaped member 13 about the center of the trolley, the other end being bent around a trunnion 9 carried by the plate 11 which is secured to the top 1 of the car and the end of the trolley is retained on the trunnion by means of a cotter pin 10, said trunnion 9 acting as a pivot for the trolley 3 with the spring 4 acting between the trolley 3 and a stationary lug 12 to which the end of the spring is attached.

The wire contacting section of the trolley should be thicker than the rest to insure durability and this portion should be reinforced by welding another section of wire to said contacting section thereof. The said reinforcing section being constructed from pure copper or other suitable metal softer than the wire 2 in order that the wear-and-tear caused by the trolley contacting the wire will wear the trolley section instead of the trolley wire 2.

The wire contacting section of the trolley should be approximately the same width as the top of the car upon which it is mounted so that it will never leave the wire when rounding sharp curves.

The spring 4, of course, should be made in accordance with the weight of the trolley, but must not be strong enough to bend it.

Figure 2:
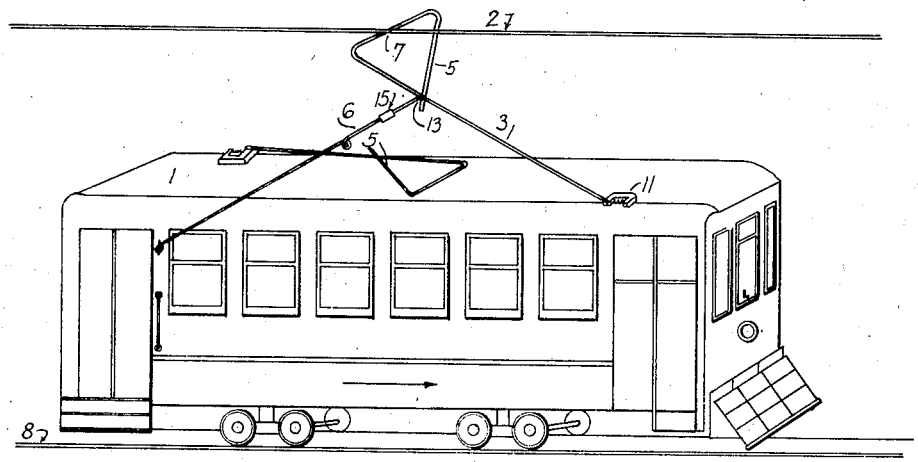
Figure 2 is a perspective view of a street car showing my improved trolley in place thereon.
Figure 3:
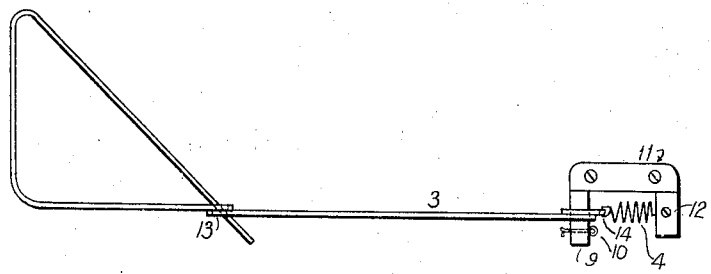
Figure 3 is a plan detail view on a large scale showing the trolley and its actuating means in detail.

The wire contacting section of the trolley is triangular in shape as shown in Figure 1, and, of course two of the trolleys are mounted on the car top as shown, the mountings being arranged in opposite corners, as clearly shown in Figures 1 and 2.

Having thus described my invention, I claim:

1. In combination with the top of a trolley car and a trolley wire, a trolley pole comprising a length of wire secured at one end to the car top and having formed at its opposite end a substantially triangular frame overlying substantially the width of the car top and adapted to contact the trolley wire, and means for lowering and raising said pole with relation to the top of the car.

2. A trolley pole comprising a single length of wire, terminating at one end in a triangular frame and adapted to overlie the trolley car top, a plate for securing one end of the wire to the car top, tension means connected to said plate and connected to the trolley pole and means for raising and lowering said pole with relation to the top of said car.

JOHN BOZOWICH.